Figure 1:
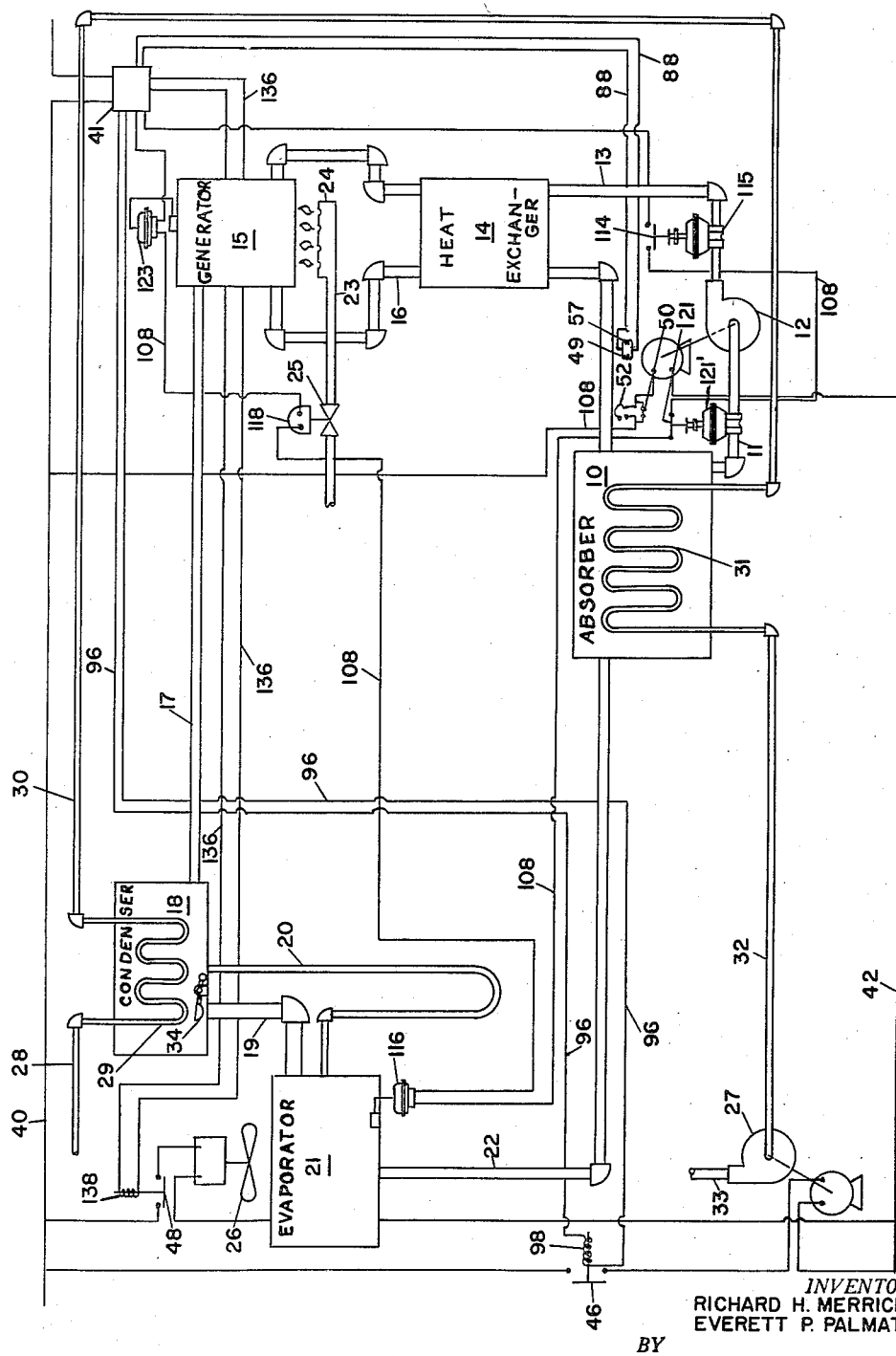

Sept. 2, 1958   R. H. MERRICK ET AL   2,850,266
CONTROL SYSTEM FOR AN ABSORPTION REFRIGERATION MACHINE
Filed Oct. 1, 1954   2 Sheets-Sheet 1

FIG. I

INVENTORS
RICHARD H. MERRICK
EVERETT P. PALMATIER
BY
Herman Seid
ATTORNEY

Sept. 2, 1958    R. H. MERRICK ET AL    2,850,266
CONTROL SYSTEM FOR AN ABSORPTION REFRIGERATION MACHINE
Filed Oct. 1, 1954    2 Sheets-Sheet 2

INVENTORS.
RICHARD H. MERRICK
EVERETT P. PALMATIER
BY
*Herman Seid*
ATTORNEY.

2,850,266

CONTROL SYSTEM FOR AN ABSORPTION REFRIGERATION MACHINE

Richard H. Merrick, East Syracuse, and Everett P. Palmatier, Solvay, N. Y., assignors to Carrier Corporation, Syracuse, N. Y., a corporation of Delaware Application October 1, 1954, Serial No. 459,657

11 Claims. (Cl. 257—3)

This invention relates generally to air conditioning apparatus and more particularly to apparatus embodying an absorption refrigeration system which may be operated to provide either a cooling effect or a heating effect. Still more specifically this invention relates to apparatus of the kind under consideration wherein the evaporator coil of the absorption refrigeration system is used as a heat exchanger in which refrigerant in vapor form is condensed when a requirement for heating is made on the system and in which refrigerant in liquid form is vaporized to produce a cooling effect, the respective changes of state occurring as air is passed in heat exchange relation with the refrigerant in the evaporator and a transfer of heat takes place.

It is contemplated that the invention provide apparatus of the type under consideration that may be used as an air conditioning unit for enclosures such as homes or the like. The absorption refrigeration system includes the basic elements such as an evaporator, an absorber, a generator and a condenser, as well as the usual connecting lines, solution pump and cooling circuit for the condenser and absorber.

It will be understood that a solution including a refrigerant such as water and an absorbent such as lithium bromide will be circulated throughout the refrigeration system in the well-known manner wherein refrigerant is released, through the operation of the generator, in vapor form to the condenser where it is normally converted to the liquid phase, when a cooling action is desired, and forwarded to the evaporator where it is vaporized to produce the cooling effect as heat from air within the enclosure is absorbed when the air is passed over the evaporator coil. The vaporous refrigerant is passed to the absorber and absorbed by the lithium bromide solution, returning from the generator, and forwarded therewith to the generator by a pump to complete the cycle. The pressure in the part of the refrigeration system including the evaporator and absorber is of an order to permit vaporization of the refrigerant in the evaporator at temperatures lower than the temperature of the air being passed through the evaporator coil. This pressure differs from the pressure in the remainder of the system and is maintained by the action of the pump and a valve or equivalent means positioned in the line between the condenser and evaporator.

One form of the system may include a condenser and the evaporator connected by two lines, the first of which has a diameter in excess of the diameter of the other. During the normal operation of the system refrigerant, such as water, passes from the condenser to the evaporator, through its smaller line, and is vaporized therein as mentioned above. When it is desired to use the system for heating, refrigerant in the vapor phase passes from the generator through the condenser and into the evaporator through both of the lines or the larger of the two lines connecting the condenser and the evaporator. A fan is mounted adjacent the evaporator coil to assist in directing air in heat exchange relation with the evaporator.

The invention herein disclosed is directed to a control system for use with apparatus of the type described which may be used to operate the system in a manner to produce a cooling effect or a heating effect. The chief object of this invention is to provide a control that is economical in its operation and which involves a simple scheme of circuits designed to produce the desired results.

Figure 2:
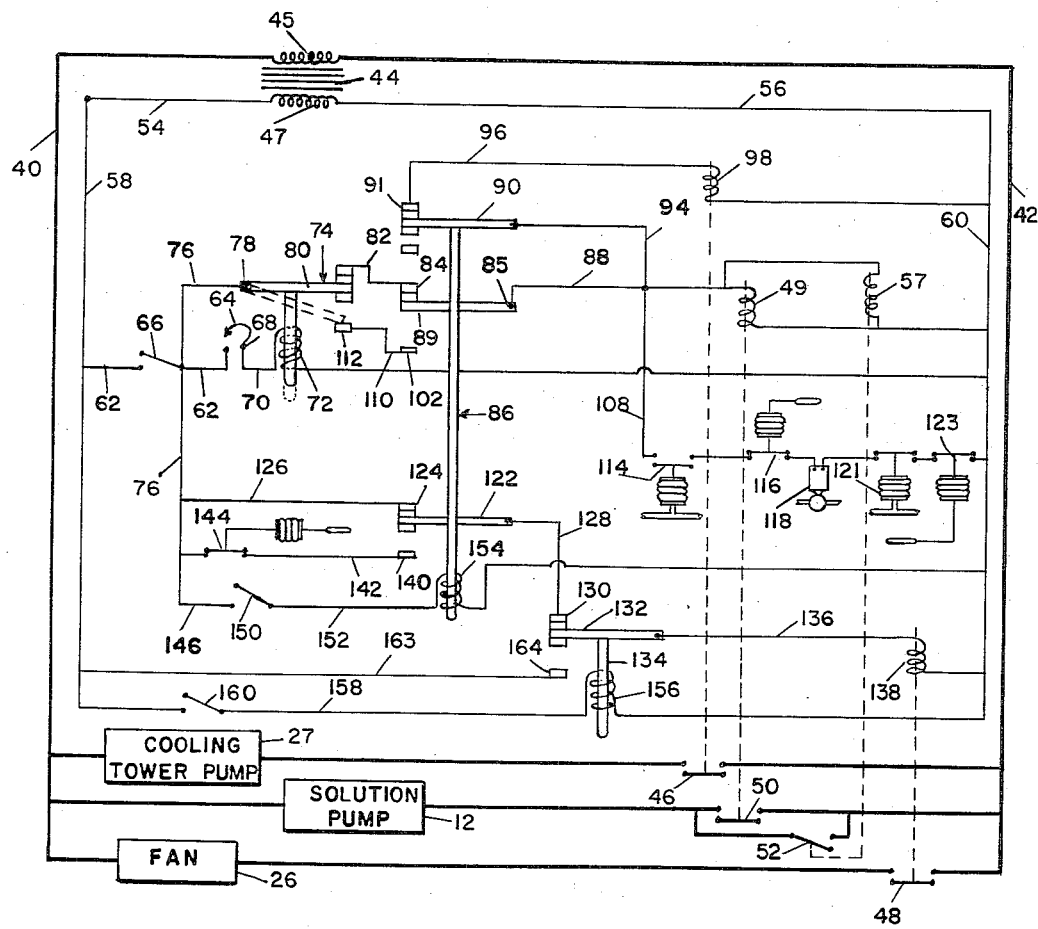

Other advantages and objects of this invention will be apparent from consideration of the ensuing description and drawings wherein Figure 1 is a diagrammatic view of the system and the control contemplated, and Figure 2 is a schematic view of the control circuit used. Referring to the drawings, there is shown diagrammatically a system of the type contemplated wherein 10 refers to an absorber of an absorption refrigeration system wherein refrigerant, such as water, in the vapor phase is absorbed by a solution rich in lithium bromide or the like.

Line 11 connects the absorber to the solution pump 12, which in turn transmits the weak solution through line 13 to a heat exchanger 14. The term "weak solution" as hereinafter employed refers to solution rich in refrigerant so that its absorbing qualities are considered to be weak, and the term "strong solution" as hereinafter employed refers to solution deficient in refrigerant so that its absorbing qualities may be considered strong.

The weak solution passes from the heat exchanger into the generator 15 where it is heated in such a manner that the water or refrigerant is boiled off in vapor form through line 17 and the resulting strong solution passes through line 16 and the heat exchanger 14 to the absorber 10. Thus it will be appreciated that the weak solution is passed in heat exchange relation with the strong solution in the heat exchanger 14. The refrigerant in the vapor phase passes into the condenser 18 from where it moves through either line 19 or 20 to the evaporator 21. From the evaporator the refrigerant passes through line 22 to the absorber to complete the refrigeration cycle.

When the system is operated to produce a cooling effect within the evaporator 21, refrigerant is condensed in the condenser 18 and transmitted through the line 20, the smaller of the two lines connecting the evaporator and condenser. Line 20 is provided with a looped portion which in turn affords a pressure seal between the evaporator and the condenser. Thus that part of the refrigeration system including the evaporator and the absorber is under a different pressure than that part of the system that includes a generator and the condenser by virtue of the action of the pressure seal and the solution pump 12. During this phase of the operation of the system the line 19, the larger of the two lines connecting the condenser and the evaporator, is closed off from the condenser by a valve arrangement 34, preferably of the form set forth in an application for Letters Patent filed in the name of Richard A. Sturley, Serial No. 459,688 filed October 1, 1954.

When it is desired to use the system for producing a heat effect, vapor flows through line 17, from the generator, through the condenser 18 and through line 19 into the evaporator where it gives up its heat of condensation to air being passed in heat exchange relation with the evaporator 21 by the fan 26. The refrigerant, during this action, condenses and flows to the absorber. It will be obvious that the amount of refrigerant in vapor form necessary to heat the air in the house will be considerably larger than the amount of refrigerant necessary to provide the cooling action through evaporation. For illustration during the winter season in many localities, the difference between a comfortable indoor temperature and the outdoor temperature is considerable as compared to the difference between the two temperatures during the summer season. For that reason it is desirable that the proposed construction be used to ensure proper and efficient all-year operation of the system.

Also shown in Figure 1 is a gas burner 24 and a fuel line 23 provided with a solenoid operated valve 25 adapted to control the flow of gaseous fuel to the burner. A cooling circuit is also provided and includes a cooling tower (not shown), a cooling tower pump 27, a line 28, a condenser coil 29, a line 30, an absorber coil 31, a line 32 leading to the cooling tower pump and line 33 leading from the pump 27 to the tower.

The control system forming the subject of this invention is arranged to permit, under conditions requiring the vaporization of refrigerant within the evaporator to produce a cooling effect, a flow of a cooling medium such as water to the condenser coil and through the circuit of which this coil forms a part. Thus it will be evident that vaporized refrigerant flowing from the generator to the condenser will be condensed into liquid form and proceed through the smaller line 20 only, by operation of valve 34, to the evaporator to be evaporated therein as the air within the enclosure is moved into heat exchange relation with the evaporator under the influence of the fan 26. The liquid refrigerant in this instance will absorb heat from the air and be vaporized thereby. When it is required to produce a heating effect with the apparatus disclosed the control circuit is operable to prevent the operation of the cooling circuit so that the vaporized refrigerant from the generator moves directly to the evaporator through the condenser 18 and into the larger line 19 without a change of state. The valve member 34 in this instance having been opened as described below. Then as the air within the enclosure is moved in heat exchange relation with the vaporous refrigerant in the evaporator, condensation of the refrigerant occurs.

The valve member 34 in the condenser 18 operates to close the line 19 during the cooling cycle so as to limit passage of liquid refrigerant to the smaller line having the pressure seal associated therewith. As stated above the coolant, when the system is operated on the cooling cycle, flows through the condenser coil 29 causing condensation of the vaporous refrigerant. As the condensate drips from the coil into a receiver formed in the valve, the latter moves downwardly against the action of a counterweight.

One embodiment of the control system forming the invention is illustrated in the drawings wherein there are disclosed two conductors 40 and 42 in communication with a power supply. Connected across conductors 40 and 42 in parallel are transformer 44 located in control box 41 and having a primary winding 45 through which a line voltage of 115 volts is passed, cooling tower pump 27, solution pump 12, and fan 26. A relay 46 is connected in series with the cooling tower pump 27 and relay 48 is connected in series with the fan 26. Relay 50 is connected in series with the solution pump. Connected in parallel with the relay 50 is thermal time delay switch 52 adapted to be actuated by a heater coil in a manner to be later described.

For the purpose of controlling the operation of the elements mentioned above in a predetermined sequence dependent in part upon the requirement for either heating or cooling being made on the system and dependent in part upon a number of conditions existing within the system, which conditions will be discussed later, a secondary control system, composed of a plurality of circuits adapted to energize the relays mentioned above, is provided responsive primarily to three switches.

The secondary control system includes the secondary winding 47 of the transformer 44. This winding is designed to have a voltage of about 24 volts impressed therethrough and is connected by conductors 54 and 55 to conductors 58 and 60 which in turn serve to connect the remaining elements of the secondary control in parallel with the transformer winding. Conductor 62 is shown connected at one end to the conductor 58 and at the other end to a fixed contact in a thermostat 64. An off-on switch 66, one of the three mentioned above, is placed in line 62 and serves to energize the major part of the secondary control system. The thermostat 64 includes a bi-metallic element 68 having a contact secured to its free end and a line 70 connected to its fixed end. The line 70 includes a coil 72 adapted to influence a relay 74 when energized. The other end of line 70 is connected to the line 60 to complete a circuit through the secondary winding of transformer 44.

Line 76 extends from line 62 to a contact 78 on the operating arm 80 of normally closed relay 74. Connected to the other end of the operating arm 80 of the relay 74 when the switch is closed is a line 82 connected in turn to one contact 84 of a set of intermediate contacts on a three pole, double throw reversing relay 86. Line 88 connects the contact 85 opposite contact 84, to the line 60 so that a circuit is made through the switch when the middle arm 89 of the switch engages the contact 84. Positioned across the line 88 between line 60 and contact 84 is a coil 49 of a relay 50 and a heating coil 57 is in turn connected in parallel across coil 49. The heater coil serves to actuate a bimetallic element in switch 52 so as to close it and make a second circuit through the solution pump motor in a manner to be later described.

Considering the relay 86, for the moment, an upper arm 90 is arranged to engage contact 91 when the switch is in its operating position. When the arm 90 engages contact 91, a circuit is made through line 94, connected to line 88, and one end of the arm, line 96 connected to contact 91 and line 60. Positioned in line 96 is coil 98 of relay 46. The intermediate arm 89 of relay 86 is adapted to engage contact 102 when moved to its lower operating position. Line 88 connects contact 102 with line 108 through intermediate arm 89 and line 110 connects contact 102 with a contact 112 adapted to be engaged by arm 80 of relay 74 when the latter is moved downwardly under the influence of the coil 72.

Line 108 is connected to line 60 through normally open switch 114 of a pressurestat 115 positioned in the discharge line of the solution pump, normally closed switch 116 responsive to the temperature of the air leaving the evaporator coil, solenoid 118 controlling the valve permitting introduction of gaseous fuel into the burner associated with the generator, normally closed switch 121 responsive through pressurestat 121' to the absorber pressure of the solution pump and normally closed switch 123 positioned on the generator stack responsive to the temperature of the flue gas.

The lower arm 122 of the switch 86 engages, in its upper operating position contact 124 on line 126 which in turn is connected to the line 76. The other end of arm 122 is connected by line 128 to contact 130 which is normally engaged by arm 132 of relay 134. Line 136 connects the relay 134 to line 60 through the coil 138 of relay 48. The lower operating position of arm 122 connects line 76, line 142 and contact 140 to line 128. A normally open switch 144 responsive to the temperature of the air surrounding the heat exchanger 21 is positioned in line 142.

Line 146 connects the Heating-Cooling switch 150 to line 76. The switch 150 is connected to line 60 through line 152 which in turn has coil 154 adapted to move the relay 86 to its lower operating position so that arms 89 and 122 engage contacts 102 and 140 respectively when energized by action of the switch 150.

The relay 134 is influenced by coil 156 in line 158 connected between lines 58 and 60. The line 158 is provided with switch 160 having a first operating position, closing the circuit and a second operating position opening the circuit through coil 156.

The switch 160 controls the operation of the fan when closed or shifted to the "continuous" position by causing relay 134 to be moved so as to complete a circuit through line 58, line 163, contact 164, relay 134, coil 138 of relay 48 and line 60. When switch 160 is open and coil 156 is de-energized, coil 138 of relay 48 is energized through the lower arm 122 of relay 86 and either of line 126 or 142. Operation of the fan when switch 160 is open and lower arm 122 is in its lower operating position is controlled by switch 144 responsive to the temperature of the air surrounding the heat exchanger. This prevents movement of air under the influence of the fan on such movement might prove uncomfortable. When operation of the fan is desired under all circumstances, switch 160 is closed.

Considering the operation of the entire control system for the air conditioning apparatus there will normally be a panel on the control box 41, provided in a readily accessible location within the enclosure, mounting the three switches 66 (Off-On), 150 (Cooling-Heating) and 160 (Automatic-Continuous). In the event there is a need for cooling within the enclosure, as normally exists in the summer or warm season, switches 150 and 160 are opened and the switch 66 is closed. With switch 150 in the open or cooling position, coil 154 is de-energized and the three pole, double throw reversing relay 86 is biased to the position shown in Figure 2. In this position the lower arm 122 completes a circuit through line 58, line 62, closed switch 66, line 76, line 126, contact 124, line 128, contact 130, relay 134 (biased to its upper operating position when coil 156 is de-energized), coil 138 and line 60 energizing coil 138 to operate relay 48 and start the fan motor. Closing of switch 160 opens the above described circuit through the relay 134 but completes the circuit through line 58, line 163, contact 164, relay 134, coil 138 and line 60 because coil 156 has been energized to move switch 134 to its lower operating position. Thus it will be evident that the operation of the fan will be assured at all times during the cooling cycle.

Closing of the switch 66 and opening of switch 150 completes another circuit including line 58, line 62, closed switch 66, line 76, switch arm 80, line 82, contact 84, intermediate arm 89 of switch 86, line 88, line 94, upper arm 90, contact 91, line 96, coil 98 of relay 46 and line 60, causing operation of the cooling tower pump. Likewise a circuit through line 58, line 62, switch 66, line 76, contact 78, switch arm 80, line 82, contact 84, intermediate arm 89, line 88, coil 49 of relay 50, coil 57 of thermal time delay switch 52, and line 60 is completed, activating solution pump 12. When the coil 57 is energized in the manner described, the heat generated causes a bimetallic contact-carrying element in the thermal time delay switch 52 to complete a bypass circuit as shown in Figure 2. The function of this by-pass arrangement is to enable a circuit through the solution pump motor to be maintained after the circuit through coil 49 has been opened. The length of time the by-pass circuit is effective is measured by the time interval required for the bi-metallic element to cool sufficiently to flex and open the circuit, the cooling action commencing, of course, when coil 57 is de-energized. With this arrangement the solution pump continues to operate for a short period although the requirement for the operation of the system may have been terminated by the action of the control system through the thermostat. This prevents the possibility of a solidification of the strong solution if permitted to remain in the generator.

Still another circuit is made through line 58, line 62, closed switch 66, line 76, arm 80 of relay 74, line 82, contact 84, arm 89 of relay 86, line 88, line 108, switches 114, 116, 121, 123, solenoid valve 118, and line 60. In the event switch 114 is closed, fuel is supplied to the burner for the generator and operation of the refrigeration cycle initiated. Switch 114 in the latter circuit closes when the discharge pressure developed by the pump in line 13 is sufficient to ensure passage of solution to the generator. The operation of the refrigeration system will terminate upon the opening of any of the switches 114, 116, 121, or 123. As pointed out above switch 114 will open in response to insufficient pressure in the discharge line of the pump. Switch 116 will open the circuit in the event the temperature of the air being passed in heat exchange relation with the evaporator or heat exchanger coil exceeds a predetermined maximum, a condition occurring when the evaporator is functioning as a heat radiator, as during the heating cycle. Switch 116 opens, so as to interrupt the circuit through the solenoid fuel supply valve, when the pressure in the line between the absorber and solution pump exceeds a predetermined value indicating the presence of air. The remaining switch 123, connected in series with the solenoid gas fuel supply valve, opens in response to a temperature of the generator flue gas which indicates that the solution is not absorbing heat properly.

The thermostat 64 within the enclosure being supplied with conditioned air is arranged to have its bimetallic element 68 contract, upon reaching a predetermined low temperature whereby a circuit comprising line 58, line 62, switch 66, thermostat 64, line 70, coil 72 and line 60 is made. This circuit causes the relay 74 to be moved downwardly under the influence of energized coil 72 so as to open the circuits through the solenoid gas valve, causing the valve to close, the cooling tower pump, and the solution pump, the latter pump of course continuing to operate for a short period due to the by-pass circuit. As the temperature of the air within the enclosure rises, bimetallic element 68 expands, opening the circuit controlling coil 72, permitting relay 74 to assume the operating position shown in Figure 2 so as to reactivate the circuits through the pumps and gas supply valve.

When it is desired that the refrigeration system function so as to produce a heating effect, the switch 150 is closed, as is main control switch 66. A first circuit including line 58, line 62, closed switch 66, line 76, closed switch 150, line 152, coil 154 and line 60 is completed, causing relay 86 to move to its lower operating position under the influence of energized coil 154. Movement of relay 86 then causes a first circuit to be made through line 58, line 62, closed switch 66, line 76, line 142, switch 144, contact 140, arm 122, line 128, contact 130, relay 134, line 136, coil 138 and line 60. The completion of this circuit is dependent, of course, on the switch 160 being open or in the "automatic" position. Coil 138 energizes the relay controlling the fan motor to initiate operation of the latter.

A second circuit is made when relay 86 moves to its lower operating position under the influence of coil 154. This circuit includes line 58, line 62, closed switch 66, closed thermostat 64, line 70, coil 72 and line 60. The energization of coil 72 moves relay 74 to the dotted position shown in Figure 2, so that a circuit through line 58, line 62, closed switch 66, line 76, arm 80, contact 112, line 110, contact 102, intermediate arm 89, line 88, coils 49 and 57, and line 60 is completed causing solution pump to operate. In addition, current is free to flow through line 58, line 62, closed switch 66, line 76, arm 80, contact 112, line 110, contact 102, intermediate arm 89, line 88, through line 94 to upper arm 90. Current likewise flows from 88 through 108, the series connected safety switches mentioned above and the solenoid valve in the fuel supply line, to line 60, so that heat is supplied to the generator.

The system continues to operate in the manner described until an excessive amount of heat is transmitted to the enclosure as reflected by the action of the thermostat 64. The thermostat operates to open the circuit through coil 72, permitting switch 74 to move to its normal upper position. Movement of the switch 74 opens the circuits through switch 86 rendering the solution pump and fuel supply valve inactive.

Thus it will be apparent that the control scheme described will promote efficient operation of the system in areas subject to variable weather conditions. The control arrangement also prevents solidification of solution through the safety circuit described.

The control system may be used with absorption refrigeration system having different structural arrangements, for example, the system might have only one line connecting the evaporator and condenser.

While only one form of the invention has been described it will be obvious that the invention may be practised in different structural arrangements without departing from the spirit thereof.

We claim:

1. Air conditioning apparatus comprising an absorption refrigeration system including an absorber, a generator, means for transmitting a solution of refrigerant and an absorbent from the absorber to the generator, means associated with the generator for heating the solution within the generator to cause a portion of the refrigerant to be separated from the solution, means controlling the operation of the solution heating means, a condenser, a line connecting the generator with the condenser for passage of refrigerant in the vapor phase to the condenser, a line connecting the generator and the absorber permitting passage of the heated solution back to the absorber, an evaporator, a fan associated with the evaporator, means connecting the evaporator and the condenser permitting passage of refrigerant either in the liquid or vapor phase to the evaporator, a line connecting the evaporator and the absorber permitting passage of refrigerant from the evaporator to the absorber, means for supplying a coolant to the condenser and absorber, and control means comprising a primary circuit including the fan, the solution transmitting means and the coolant supplying means connected in parallel, regulating relays associated with each element in the primary circuit, secondary circuit means for energizing the regulating relays in one sequence to cause liquid refrigerant to be supplied to the evaporator and be vaporized therein as air under the influence of the fan is caused to circulate in heat exchange relation therewith, and in another sequence to cause vaporous refrigerant to flow directly to the evaporator to be condensed therein as the air flows over the evaporator, said secondary circuit means further being adapted to regulate said solution heating control means.

2. The invention described in claim 1 wherein the secondary circuit means controlling said solution heating control member includes a switch responsive to the temperature of a portion of the generator.

3. The invention described in claim 1 wherein the secondary circuit means controlling said solution heating control member includes a switch responsive to a predetermined condition of the solution transmitting means.

4. The invention described in claim 1 wherein the secondary circuit means controlling said solution heating control member includes a switch responsive to the temperature of the air leaving the evaporator coil.

5. The invention described in claim 1 wherein the secondary circuit means controlling said solution heating control member includes a switch responsive to the pressure of the absorber.

6. The combination recited in claim 1 wherein the means for transmitting solution to the generator from the absorber including a pump and the control means includes a first circuit including the solution pump motor, a relay connected in series with the motor and means connected in parallel with the relay for maintaining a circuit through the motor for a predetermined time after the circuit through the relay has been opened.

7. Control means of the type described in claim 6 including a first circuit comprising the solution pump motor, an operating relay in series with the motor, a thermal time delay switch connected in parallel with the switch to form a second path of current flow through the pump motor and means controlling the operation of the relay and switch whereby a circuit is maintained through the switch after the circuit through the relay has been interrupted.

8. The invention as described in claim 7 wherein said last mentioned means includes a heater coil adapted to complete a circuit through the thermal time delay switch upon energization.

9. Heating and cooling apparatus comprising an absorption refrigeration system including an absorber, a generator, a condenser, and an evaporator connected to form a circuit for the flow of refrigerant and a solution of refrigerant absorbing means and refrigerant; means for regulating operation of the condenser to either liquify vaporous refrigerant flowing from the generator or supply vaporous refrigerant directly to the evaporator; and means operable to control operation of the first mentioned means, said second mentioned means including a first electric circuit means operable to influence the first mentioned means to operate the apparatus so that heat is rejected in the evaporator from the vaporous refrigerant flowing therein, second electric circuit means operable to influence the first mentioned means to operate the apparatus so that heat is absorbed in the evaporator, said circuits including components common to each circuit means, and a circuit controlling relay having a first operating position for completing the first circuit means and a second operating position for completing the second circuit means.

10. The invention set forth in claim 9 wherein one portion of each electric circuit means controls the generator, said portion including a switch responsive to the temperature of said generator.

11. The invention set forth in claim 9 wherein said absorption refrigeration system includes a pump for forwarding a solution of refrigerant and refrigerant absorbing means from the absorber to the generator, and one of said electric circuit means includes a bypass circuit affective to temporarily prolong the operation of the solution pump after the circuit controlling the operation of the solution pump is interrupted.

References Cited in the file of this patent

UNITED STATES PATENTS

| | | |
|---|---|---|
| 2,381,427 | Andersson | Aug. 7, 1945 |
| 2,461,513 | Berestneff | Feb. 15, 1949 |
| 2,480,544 | Buffington | Aug. 30, 1949 |
| 2,557,573 | Sherwood | June 19, 1951 |
| 2,593,038 | Lehane et al. | Apr. 15, 1952 |

UNITED STATES PATENT OFFICE
CERTIFICATE OF CORRECTION

Patent No. 2,850,266                        September 2, 1958

Richard H. Merrick et al.

It is hereby certified that error appears in the printed specification of the above numbered patent requiring correction and that the said Letters Patent should read as corrected below.

Column 5, line 9, for "on such" read -- when such --.

Signed and sealed this 25th day of November 1958.

(SEAL)
Attest:

KARL H. AXLINE                           ROBERT C. WATSON
Attesting Officer                       Commissioner of Patents